UNITED STATES PATENT OFFICE.

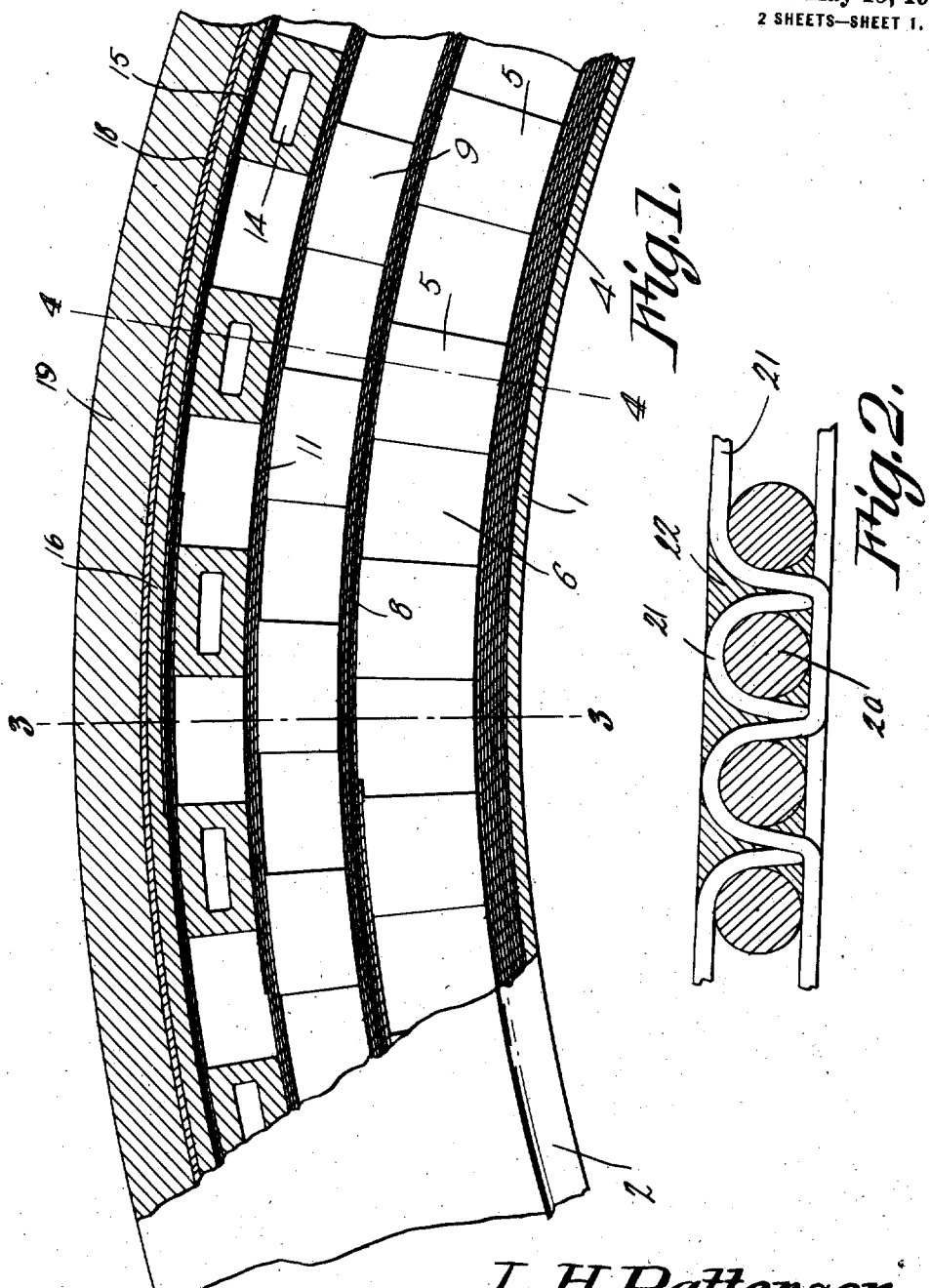

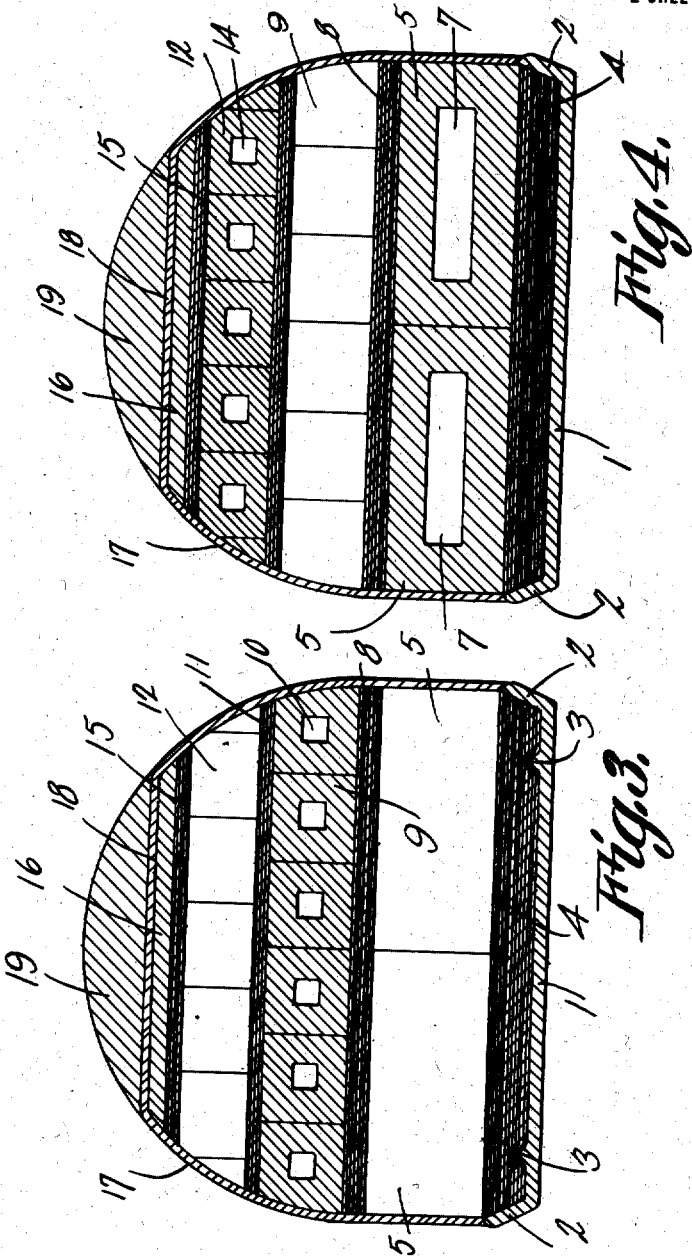

LON H. PATTERSON, OF PORTLAND, OREGON.

AIRLESS AUTO-TIRE.

1,226,110.    Specification of Letters Patent.    Patented May 15, 1917.

Application filed July 14, 1916. Serial No. 109,349.

*To all whom it may concern:*

Be it known that I, LON H. PATTERSON, a citizen of the United States, residing at Portland, in the county of Multnomah and State of Oregon, have invented a new and useful Airless Auto-Tire, of which the following is a specification.

The device forming the subject matter of this application is a tire, and one object of the present invention is to provide a tire in which pneumatic elements, subject to puncture and deterioration, may be dispensed with.

Another object of the invention is to provide a tire including a plurality of circumferentially extending binding members and suitable filling means between the binding members, the binding members being fashioned from strips of fabric wound in a plurality of layers, circumferentially of the structure, and being so constructed that they will not stretch.

A further object of the invention is to provide a tire of the kind described, including a plurality of blocks, so positioned with respect to each other that the necessary resiliency will be afforded.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 shows in longitudinal section, a portion of a tire constructed in accordance with the present invention, parts appearing in elevation;

Fig. 2 is a fragmental transverse section of one of the fabric strips, the view being diagrammatic in nature and illustrating the relations existing between the threads of the strip;

Fig. 3 is a cross section on the line 3—3 of Fig. 1; and

Fig. 4 is a cross section on the line 4—4 of Fig. 1.

In carrying out the invention there is provided a rim 1 which may be made of metal if desired, the same, in the present instance, but not of necessity, including side flanges 2. Projecting outwardly from the rim 1 between the side flanges 2 are integrally formed lugs 3.

The invention includes a binder in the form of a strip 4, wound around the rim 1, between the side flanges 2, tightly, in a plurality of convolutions, until the desired thickness is obtained. The strip 4 fills the space between the flanges 2 closely, as clearly indicated in Figs. 3 and 4. The strip 4 preferably is made out of textile material, and its construction will be alluded to hereinafter. Any suitable means may be provided building up the tire on the strip 4, but in the present instance, a plurality of blocks 5 are placed on the strip. The blocks 5 may be made out of rubber or a rubber compound, and they are preferably spaced from each other, circumferentially of the tire, to define chambers 6. The blocks 5 may be provided with internal compartments 7.

Surrounding the blocks 5 is a binder 8, preferably in the form of a strip of textile material, like the strip 4, the strip 8 being wound around the blocks 5, circumferentially of the tire, in a plurality of convolutions, until the desired thickness is obtained. Supported on the strip 8 are blocks 9 which may be made of rubber, the blocks 9 being provided with internal compartments 10. Preferably but not necessarily, as indicated in Fig. 1, the blocks 9 are not alined radially with the blocks 5. The blocks 9, at one end, project beyond the corresponding ends of the blocks 5, so that the said end of the blocks 9 are supported on those portions of the strip 8 which extends between the blocks 5. In this manner, the resiliency of the tire is enhanced greatly.

Circumscribing the blocks 9 is a strip 11, constituting a binder. The strip 11 extends around the blocks, circumferentially of the tire, in a plurality of convolutions, until the desired thickness is obtained, the strip 11 being made of textile material, as hereinbefore set forth.

Supported on the strip 11 are blocks 12 having internal chambers 14. The blocks 12 are not alined radially with the blocks 9, but project at one end beyond the corresponding end of the block 9, the projecting ends of the blocks 12 being supported by those portions of the strip 11 which bridge the spaces between the blocks 9. The blocks 9 are separated from each other, and the blocks 12 are separated from each other, circumferentially of the tire. This detail, however, is not insisted upon. The blocks 12 are provided with internal chambers 14.

Circumscribing the blocks 12 is a binder in the form of a strip 15 of textile material, wound in place, circumferentially of the tire, until the desired thickness is obtained.

Superposed on the strip 15 is a vulcanizable layer 16, flattened on its tread side. Inclosing the layer 16 and all of the blocks mentioned, and extended inwardly to the side flanges 2 of the rim 1 is a casing 17. The casing 17 may be made out of fabric, so constructed that it may be vulcanized. The casing 17 is flattened as shown at 18 to receive a tread 19, ordinarily made of rubber or a rubber compound, and adapted to be vulcanized.

Especial attention is directed to the various strips 4, 8, 11 and 15. In Fig. 2 of the drawings, the warp threads of these strips are shown at 20, and the weft threads are shown at 21. The weft threads 21 are smaller in diameter than the warp threads 20, and in practice, it may be found convenient to make the weft threads of about one-quarter of the diameter of the warp threads. The weft threads 21 may be left somewhat slack, and as a consequence, all of the stretch may be taken out of the warp threads 20, the weft threads 21 having no binding or bridging action on the warp threads, preventing the necessary stretching of the warp threads. As a consequence, the various strips may be elongated until the stretch is taken out of them entirely. The strips may be impregnated with a filler 22, which may be of vulcanizable material.

A tire constructed in accordance with the present invention may be vulcanized to form a structure which, although possessing the necessary resiliency, will be exceedingly compact and strong.

The construction of the device is such that, if desired, the metal rim 1 may be omitted.

Having thus described the invention, what is claimed is:—

1. A tire comprising a plurality of circumferential binders; and sets of blocks between the binders, the blocks of the sets being spaced from each other circumferentially of the tire, the blocks of the respective sets being supported at one end by those portions of the binders which bridge the spaces between the blocks of an adjoining set, and being supported at the other end upon the blocks of an adjoining set.

2. A tire comprising binders in the form of continuous circumscribing strips disposed in a plurality of convolutions; and filling means between the binders; each of the strips including warp threads and weft threads, the weft threads being of smaller diameter than the warp threads, and the weft threads being flexed upon abrupt angles giving slackness to the weft threads.

In testimony that I claim the foregoing as my own, I have hereto affixed my signature in the presence of two witnesses.

LON H. PATTERSON.

Witnesses:
ARTHUR BERRIDGE,
F. H. PATTEN.